United States Patent [19]

Mandelcorn et al.

[11] 4,054,937
[45] Oct. 18, 1977

[54] CAPACITOR

[75] Inventors: Lyon Mandelcorn, Pittsburgh; Robert L. Miller, Murrysville, both of Pa.; George E. Mercier; John H. Pickett, both of Bloomington, Ind.; Thomas W. Dakin, Murrysville, Pa.

[73] Assignee: Westinghouse Electric Corporation, Pittsburgh, Pa.

[21] Appl. No.: 681,292

[22] Filed: Apr. 28, 1976

[51] Int. Cl.² ........................ H01G 4/22; H01B 3/00
[52] U.S. Cl. ................................ 361/319; 361/315; 252/63; 252/63.2
[58] Field of Search ............... 317/258, 259; 252/63, 252/64, 63.2, 63.7

[56] References Cited

U.S. PATENT DOCUMENTS

| 3,275,914 | 4/1971 | Hoffman et al. | 317/258 |
|---|---|---|---|
| 3,565,960 | 2/1971 | Schisla et al. | 252/64 |
| 3,796,934 | 3/1974 | Munch | 317/259 |
| 3,937,664 | 2/1976 | Tanimoto | 252/64 |

Primary Examiner—Benjamin R. Padgett
Assistant Examiner—Josephine Lloyd
Attorney, Agent, or Firm—Richard D. Fuerle

[57] ABSTRACT

A capacitor is disclosed of layers of metal foil alternating with insulating sheets impregnated with a dielectric fluid. The dielectric fluid comprises a mixture of 80 to 99% by weight mono-ethylated, mono-propylated, or mono-butylated biphenyl, biphenyl oxide, or biphenyl methane and about 1 to about 20% by weight di-ethylated, di-propylated, or di-butylated biphenyl, biphenyl oxide, or biphenyl methane.

15 Claims, 1 Drawing Figure

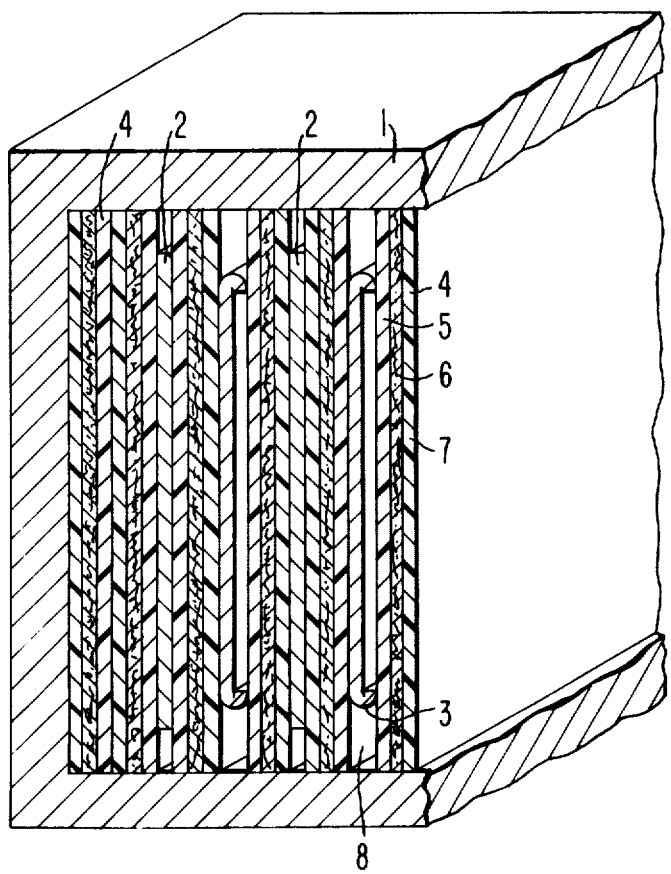

CAPACITOR

BACKGROUND OF THE INVENTION

The use of polychlorinated biphenyls as dielectric fluids, even in sealed electrical equipment, may become very restricted because they are alleged environmental pollutors, which is aggravated by their low biodegradability. Efforts during the past few years to develop dielectric fluids that could replace trichlorobiphenyl as the impregnant of polypropylene-film-paper and all paper capacitors and to be used with 100% film have been directed mostly at materials with aromatic groups. Highly aromatic fluids have been considered as alternates to permit continued operation of the capacitors at high voltages because they have good corona properties, and the operational voltages of a power capacitor depends on its resistance to corona generating overvoltages. Examples of potentially good power capacitor fluids are solutions of a phthalate ester, diisononylphthalate, and an aromatic, solutions of an aromatic hydrocarbon and an aromatic sulfone, and isopropylnaphthalene, which is used in Japan.

These fluids are biodegradable, but do not have the excellent resistance to combustion, the "non-flammability," that polychlorinated biphenyls have. But their flash and fire points are as high as that of mineral oil which is widely used as an electrical insulating fluid. They would not be considered to be serious fire hazards in most power capacitors, which are usually mounted outdoors, because of the small volume of fluid per unit, less than 3 gallons, the fire safety limit for such fluids.

The emphasis on high operating voltage stresses is particularly significant for the KVAR rating of film-paper capacitors, where the magnitude of the dielectric constant of the impregnant is not too important. The KVAR rating is proportional to the product of the square of the operating voltage and the first power of the capacitance. In the film-paper dielectric the capacitance is only slightly affected by the dielectric constant of the impregnant, as it is dominated by the film, whose dielectric constant is not changed much by the impregnant because only a small amount of fluid is absorbed by it. The average dielectric constant of a 75% film and 25% paper dielectric is decreased by only 105 by changing the impregnant from one with a relative dielectric constant of 4.9, trichlorobiphenyl, to one with 2.2 to 2.6, a hydrocarbon. On the other hand, for an impregnant that permits a modest increase in operating voltage stress, the KVAR rating is increased by about twice that fractional voltage stress increase.

The level of the rated stress is based on the expectation that a power capacitor will be subjected periodically to high overvoltages, due to switching and certain transients in the power lines, which are of the order of up to three times the rated voltage. It must resist the effects of such overvoltages, which generate corona discharges in the fluid, in two ways. One is that corona cannot persist, that it extinguishes, after the rated voltage is restored. Secondly, the corona at the overvoltage should not damage the dielectric and lead to early failure, before the 20 to 30 years of required operating life of the capacitor. Such effects in a capacitor may be gauged by its corona discharge inception and extinction voltages, which are determined by the nature of the impregnant, where the corona occurs, and a proper selection of capacitor dielectric spacer arrangements and foil electrode geometry.

It is not very clear why aromatic fluids have relatively good corona properties, especially compared to aliphatics. Their good corona properties are evidenced by high capacitor corona discharge inception, and extinction voltages, and relatively low gassing tendencies of the liquid under high voltage, in tests such as the modified Pirelli Gassing Test (ASTM D2300). A similar situation exists regarding additives, such as anthraquinones and epoxies, that improve the corona properties of fluids. Regarding resistance to the effects of corona, high extinction voltage and low gassing, it is suggested that the aromatic molecules or constituents, or additives, react with the products of corona discharge, preventing build-up of gas bubbles of hydrogen and hydrocarbons at the original site of the corona, so that corona may not persist there. (A similar suggestion has been made about the high corona discharge extinction voltages with polychlorinated biphenyls, that their corona products, such as hydrogen chloride, are soluble or reactive.) This general explanation is not sufficient to present a systematic order of resistance to corona, and to use as a basis of selection of corona resistant fluids. As for the magnitude of the corona inception voltage, the molecular factors that affect it are also quite unclear.

PRIOR ART

U.S. Pat. No. 3,796,934 discloses the use of isopropyl biphenyl in sulfones as a dielectric fluid for capacitors.

U.S. Pat. No. 3,275,914 discloses the use of monoisopropyl biphenyl as a dielectric fluid in a mica capacitor.

Japanese Utility Model applications 28516/74 (lay open number 117349/75) and 34141/74 (lay open number 117350/75) disclose the use of narrow foil with rounded edges alternating with straight foil in capacitors.

SUMMARY OF THE INVENTION

We have found that a capacitor having as a dielectric fluid a mixture of mono- and di-alkylated biphenyl, biphenyl oxide, or biphenyl methane has unexpectedly good properties. The capacitors have high corona inception and extinction voltages, typically about 7 kV, for 1.5 mil polypropylene film plus 0.5 mil paper thickness, and low power factors. They have good thermal stability and can be operated at lower temperatures than capacitors containing trichlorobiphenyl.

The dielectric fluid used in the capacitors is readily available, non-toxic, has a broad fluidity range, and is easily purified, if necessary. Its flammability is acceptable.

DESCRIPTION OF THE INVENTION

The accompanying drawing is a partial isometric sectional view of a certain presently preferred capacitor winding according to this invention.

In the drawing, a container 1 which is hermetically sealed holds one or more windings containing straight conducting foil 2 and a conducting foil 3 which is narrower and has rounded edges. These foils alternate with layers of insulation 4, here shown as film 5, paper 6, and film 7. A dielectric fluid 8, according to this invention, fills container 1 and impregnates the winding. Electrode terminations may be provided in accordance with conventional practice. Also, the dielectric layers will tend to conform to the spaces available so that in practice the large spaces shown in the drawing will be substantially reduced.

The dielectric fluid of this invention comprises about 80 to about 99% (all percentages herein are by weight based on dielectric fluid weight unless otherwise indicated) of a compound having the general formula

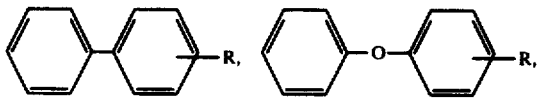

or

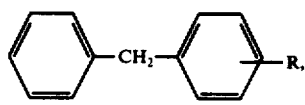

or mixtures thereof, and about 1 to about 20% of a compound having the general formula

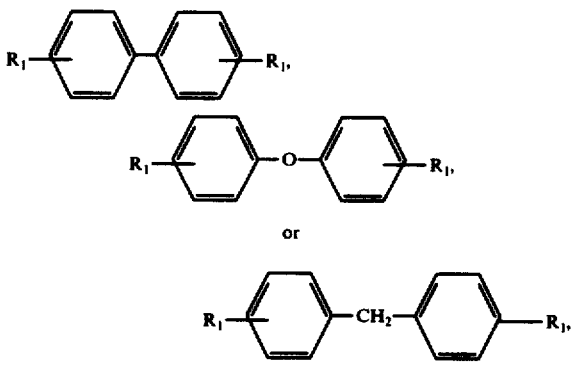

or mixtures thereof, where each R and $R_1$ is independently selected from alkyl from $C_2$ to $C_4$. All R and $R_1$ groups are preferably identical as the mono- and dialkyl compounds can then be prepared in the same batch. The mono- and diisopropyl biphenyls, for example, can be prepared by reacting propylene with biphenyl in the presence of a catalyst such as aluminum chloride. Normal alkyl groups are preferred for best thermal stability, although isopropyl is presently preferred because it is available. Propyl groups are preferred to ethyl groups because they give a greater fluidity range, and lower vapor pressure, and they are preferred to butyl for better corona resistance. Methyl compounds are not acceptable due to high melting point and high vapor pressure. Higher alkyl groups than butyl may not be acceptable due to high pour points.

The biphenyl oxide compounds are preferred to the biphenyl compounds because they have higher dielectric constants. However, the biphenyl compounds are more practical due to the limited availability of the biphenyl oxide compounds.

Due to the method of preparation, the dielectric fluid may contain some biphenyl. Biphenyl is irritating and volatile, and therefore it is desirable that it not be present at more than 5% and preferably at less than 0.5%.

The dielectric fluid preferably includes up to about 1% of an anti-oxidant for thermal stability. The preferred amount is about 0.01 to about 0.2% and the preferred anti-oxidants are di-t-butyl-paracresol, di-t-butyl phenol, or mixtures thereof.

The fluid also preferably includes up to about 2%, and preferably about 0.1 to about 0.5%, of a hydrogen acceptor for improved corona resistance. An anthraquinone such as β-methylanthraquinone, anthraquinone, or β-chloranthraquinone may be used. Because it is readily available and more soluble β-methylanthraquinone is preferred.

The anti-oxidant and hydrogen acceptor seem to interact to produce a loss of corona resistance when either one is used at high concentrations. Therefore, preferably neither is used at more than 1%. A composition in which both are effective contains about 0.2% di-t-butylparacresol and about 0.5% β-methylanthraquinone.

Though not necessarily preferred, the fluid may include up to about 2%, and preferably about 0.05 to about 1% of an epoxy such as glycidyl phenyl ether for corona resistance.

The following are some of the significant properties of a composition available commercially from Sun Oil Company under the designation "X489-17," which is 95.5% mono-isopropyl biphenyl, 4% di-isopropyl biphenyl, and 0.5% biphenyl regarding its use in power capacitors:

```
Specific Gravity at 25° C - .98 gr/cc
Viscosity - 10 cs at 23° C
          - 2 cs at 81° C
Pour Point - -.51° C
Vapor Pressure at 100° C - ~1 Torr*
Dielectric Constant, ε'ₙ at 100° C, 60 Hz - 2.6
Dissipation Factor at 100° C - .2%
Dielectric Strength (ASTM D877) - >60 KV
Flash Point, C.O.C. - 150° C
Fire Point - 165° C
Biodegradability - High, greater than mineral oil
Toxicity - Low
```

*Low content of 2-isopropylbiphenyl isomer which has higher VP's than other isomers.

The capacitors are preferably film (e.g., polypropylene)-paper or 100% film because, as hereinbefore explained, the dielectric constant of the fluid is not as important in these types of capacitors.

The following examples further illustrate this invention.

EXAMPLE 1 — SMALL CAPACITOR TESTS

Experiments were made with small capacitors having a capacitance of about 0.13 μF. The capacitors had a film-paper-film (AFPFA) winding of 2¼ inch wide. 0.75 mil polypropylene film sold by Hercules under the trade designation "EK500," 3 inch wide 0.45 mil 0.9 density paper, and 1¼ inch wide aluminum foil. The capacitors were first heated under vacuum at about 145° C for 2 days, impregnated at about 90° C, and then heated for about 20 hours at 100° C.

The following fluids were evaluated as impregnants for these test capacitors.

1. Trichlorobiphenyl sold by Monsanto under the trade designation "MCS1016."
2. Isopropylbiphenyl provided by Sunoco under the designation "X489-17."
3. Isopropylnaphthalene provided by Sunoco under the designation "X489-8."
4. Diisononylphthalate sold by Exxon under the trade designation "ENJ-2065."
5. 80% Isopropylbiphenyl and 20% xylyl tolyl sulfone provided by Monsanto under the trade designation "MSC1238." (See U.S. Pat. No. 3,796,934.)
6. 40% Diisononyl phthalate and 60% isopropyl biphenyl.

To the trichlorobiphenyl was added 0.3% β-methylanthraquinone. No anti-oxidant was used because trichlorobiphenyl is not prone to oxidation.

To the other fluids was added 0.2% di-tert-butyl paracresol and 0.5% β-methylanthraquinone. It is important that the concentrations of the two additives be at the specified levels for both to be effective. They seem to interact, and at different concentration ratios, only the additive whose concentration ratio was increased may be effective.

The corona properties of the capacitors were based on determinations of corona discharge inception and extinction voltages, DIV and DEV, and overvoltage resistance. In the overvoltage test, overvoltages at three times the steady voltage were applied for a duration of 0.1 second (i.e., six 60 Hz cycles) to the test capacitor every 3 minutes during continuous energization. Corona pulse measurements were made continuously and noted at the overvoltage and subsequently at the second 60 Hz cycle and at about 1 to 2 minutes. The number of such overvoltages applied till failure, the primary measure of overvoltage resistance, may be correlated with the corona pulses, and possibly also with the DIV'S and DEV'S. The overvoltage in these tests was 8.1 KV, and the steady voltage 2.7 KV, which for the hydrocarbon impregnated dielectrics is at least 10% above the voltage required to give them the same KVAR per unit volume as the present trichlorobiphenyl impregnated dielectric.

Corona discharge inception and extinction voltages of the capacitors at 25° C are recorded in Table 1a, and at −25° C in Table 1b. Corresponding pulse magnitudes with the inception voltages are included; the extinction voltages were determined when the pulses decreased to <3–5 picocoulombs, the sensitivity limit of the corona detector with these capacitors. The highest corona inception voltages were found for the capacitors impregnated with isopropylbiphenyl. At −25° C, and with 2.7 KV, the capacitor with this impregnant had very little corona, while ones with trichlorobiphenyl and the solution of isopropylbiphenyl and xylyl tolyl sulfone had considerable corona.

The overvoltage test results are given in Table 2, which includes the corona pulse magnitudes and failure times. It can be seen that capacitors impregnated with isopropylbiphenyl performed generally better in this test than ones with other impregnants. Their failure times were of the highest obtained. One such unit, in fact, did not even have corona at the overvoltages, and it sustained 2960 of these without failing. It is significant that it maintained its corona inception voltage above the test limits throughout these successive overvoltage applications.

A capacitor dielectric must have adequate thermal stability under operating voltage, besides good corona properties. Table 3 is a summary of relative life results obtained for the film-paper-film test capacitors impregnated with the various fluids considered here. These capacitors were aged at 115° C with 3.0 KV, and the effects of aging were based on their power factors which were measured periodically. The capacitors with the various impregnants all have about the same thermal stability. It can be expected, therefore, that the operational life expectancy of capacitors impregnated with isopropylbiphenyl would be the same as those with trichlorobiphenyl on the basis of thermal effects.

TABLE 1

Corona Discharge Inception and Extinction with Various Impregnants in Film-Paper-Film Test Capacitors; .75 mil polypropylene film, .45 mil .9 density paper, ∼ .13μF capacitance.

| a. at 25° C Impregnant | DIV, KV | Pulse Height, pC | DEV, KV |
|---|---|---|---|
| Trichlorobiphenyl | 4.2 | 90 | 3.2 |
| Isopropylbiphenyl | 6.7 | 80 | 3.8 |
| Isopropylnaphthalene | 6.7 | 120 | 3.8 |
| Diisononylphthalate, DINP | 4.4 | 150 | 1.3 |
| Isopropylbiphenyl + 20 w % xylyl tolyl sulfone | 4.6 | 95 | 2.7 |
| DINP + 60 w % isopropylbiphenyl | 6.4 | 140 | 2.6 |

| b. at −25° C Impregnant | DIV, KV |
|---|---|
| Trichlorobiphenyl | 2.5 |
| Isopropylbiphenyl | 2.9 |
| Isopropylbiphenyl + 20 w % xylyl tolyl sulfone | 2.9 |

TABLE 2

Effect of 60 Hz Overvoltage Surges on Test Capacitors with Various Impregnants; Film-Paper-Film, .75 mil polypropylene film, .45 mil .9 density paper, ∼ .13 μF capacitance. Overvoltage, 8.1 KV, is 3X steady voltage of 2.7 KV, applied for 6 cycles every 3 minutes.

| Impregnant | Pulse Height, pC During Overvoltage | 2 Cycles After OV | During 3 Min. | Number OV Surges to Failure |
|---|---|---|---|---|
| Trichlorobiphenyl | 1000 | 200 | 100 | 10, 35, 40, 45, 105 |
| Isopropylbiphenyl | <6–400 | <5–40 | <5 | 200, 400, >2960 |
| Isopropylnaphthalene | 400 | 1000 | <5–6000 | 80, 120 |
| Diisononylphthalate, DINP | 12000 | 4000 | 200 | 10 |
| Isopropylbiphenyl + 20 w % xylyl tolyl sulfone | 5000 | 1000–200 | 100–1000 | 360, 620 |
| DINP + 60 w % isopropylbiphenyl | 3000 | 20–1000 | 1000 | >450 |

TABLE 3

Thermal Life of Test Capacitors With Various Impregnants, at 115° C and 3 KV; Film-Paper-Film, .75 mil polypropylene film, .45 mil .9 density paper, ∼ .13 μF capacitance.

| Impregnant | Relative Life |
|---|---|
| Trichlorobiphenyl | 1 |
| Isopropylbiphenyl | 1 |
| Isopropylnaphthalene | 1.4 |
| Diisononylphthalate, DINP | 1.7 |
| Isopropylbiphenyl + 20 w % xylyl tolyl sulfone | .6 |
| DINP + 60 w % isopropylbiphenyl | 1.1 |

EXAMPLE 2 — FULL-SIZE CAPACITOR TESTS

Full-size power capacitors rated 50 KVA were also tested using isopropylbiphenyl fluid of Example 1 with 0.2% di-tert-butyl paracresol and 0.5% β-methylanthraquinone added as stabilizers. The solid dielectric materials used were various combination of capacitors grade polypropylene film, kraft paper, synthetic paper, and surface modified polypropylene films for all-film type dielectric systems. Aluminum foil electrodes used were conventional equal width foils and unequal width foils with the narrow foil having its edges folded over to eliminate the normal sharp and uneven slit edges (see FIG. 1).

These full-size capacitors were compared with conventional capacitors impregnated with trichlorobiphenyl plus stabilizer of the same rating and construction as the isopropylbiphenyl types. The following table compares the capacitance changes of the two systems in the temperature range of −40° to 100° C. The isopropylbiphenyl type is much more stable with temperature change throughout the temperature range and can be used at a lower minimum operating temperature than trichlorobiphenyl.

| Dielectric | % of 25° C Capacitance | |
|---|---|---|
| Temperature (° C) | Trichlorobiphenyl | Isopropylbiphenyl |
| −40 | 99 | 101.2 |
| −30 | 102.5 | 101.1 |
| −20 | 103 | 101 |
| 0 | 102 | 100.7 |
| 100 | 94 | 95.5 |

The power factor versus temperature characteristic was also measured and found to be lower for the isopropylbiphenyl impregnated types throughout the temperature range. This comparison is shown in the following table.

| Dielectric | % Power Factor at Rated Voltage | |
|---|---|---|
| Temperature (° C) | Trichlorobiphenyl | Isopropylbiphenyl |
| −40 | 1.00 | 0.100 |
| −20 | 0.500 | 0.068 |
| 0 | 0.200 | 0.050 |
| 20 | 0.070 | 0.040 |
| 60 | 0.045 | 0.035 |
| 100 | 0.048 | 0.037 |

Another important capacitor electrical characteristic is the relationship between power factor and voltage stress, especially at high dielectric temperatures. Power factor versus voltage stress measurements were made at 100° C for units with isopropylbiphenyl and for trichlorobiphenyl. These are compared in the following table, and this data shows the greater stability of the isopropylbiphenyl impregnated type.

| % Rated Voltage Stress | % Power Factor at 100° C | |
|---|---|---|
| | Trichlorobiphenyl | Isopropylbiphenyl |
| 10 | 0.050 | 0.050 |
| 30 | 0.045 | 0.042 |
| 50 | 0.040 | 0.040 |
| 70 | 0.041 | 0.038 |
| 100 | 0.048 | 0.037 |
| 130 | 0.060 | 0.037 |

Overvoltage endurance tests were made to determine the capacitor's ability to withstand the short-time overvoltages which are experienced in normal capacitor applications. Two types of tests were made. The first type was a room temperature test in which the capacitor was subjected to a short-time step-stress applied once every 30 minutes and stepped up to a higher voltage stress each day. The short-time stress is followed by an application of 150% of rated voltage for 5 minutes followed by 100% of rated voltage for 25 minutes. The second type voltage endurance test is a low temperature test in which the test capacitor is cooled overnight to a temperature of −25° C, then given a short-time step stress voltage once every 30 minutes for about 8 hours each day and then de-energized and recooled to −25° C overnight and a higher step voltage applied the following day. In this test, the short-time step-stress is followed by 110% of rated voltage for 25 minutes. In each of these tests, the short-time voltage is increased by 10% voltage steps each day until the capacitors fail. A special sonic detector is used in conjunction with the test to measure the relative intensity of partial discharges occurring in the fluid system at the electrode edges. A transducer is affixed to the capacitor case and the signal amplified and recorded during the overvoltage endurance tests.

In the room temperature overvoltage endurance tests, a capacitor with unequal width foil electrodes with the edges folded over on the narrow foil, a film-paper dielectric (AFPa,), and isopropylbiphenyl fluid was compared to a similarly constructed capacitor impregnated with trichlorobiphenyl. This data is shown in the following table where it can be seen that the isopropylbiphenyl units have the capability of sustaining higher overvoltages before failure and the measured partial discharge intensities are lower at each test level for the isopropylbiphenyl system.

| | Overvoltage Endurance Tests at 25° C Relative Partial Discharge Intensity | |
|---|---|---|
| % Rated Voltage | Trichlorobiphenyl (AFPa,) | Isopropylbiphenyl (AFPa,) |
| 200 | 14 | |
| 210 | 14 | |
| 220 | 20 (failed) | |
| 230 | | 20 |
| 240 | | 50 |
| 250 | | 500 |
| 260 | | 10,000 |
| 270 | | 20,000 |
| 280 | | 100,000 (failed) |

In the low temperature tests, the difference between isopropylbiphenyl and trichlorobiphenyl is even more dramatic. This is probably due to the well-known minimum in the partial discharge inception voltage versus temperature relationship that occurs at about −20° to −10° C for trichlorobiphenyl. Capacitors of identical constructions using both the equal foil width (AFPFA) construction and also the unequal foil width (AFPa,) construction were tested. The test data is shown in the following table. Again, the isopropylbiphenyl type units sustain a higher overvoltage before failure and the partial discharge intensitites are lower at each test level.

| | Overvoltage Endurance Tests with −25° C Pretreat Relative Partial Discharge Intensity | | | |
|---|---|---|---|---|
| Rated Voltage | Trichlorobiphenyl | | Isopropylbiphenyl | |
| | AFPFA | AFPa, | AFPFA | AFPa, |
| 170 | (Partial discharge | 6 | 2000 | 8 |
| 180 | intensity was not | 20 | 800 | 8 |
| 190 | recorded | 12 | 900 | 12 |
| 200 | | 10 | 4000 | 10 |
| 210 | Failed | 40 | 4000 | 12 |
| 220 | | 18 | 2000 | 14 |
| | | Failed | Failed | |
| 230 | | | | 200 |
| 240 | | | | 1000 |
| 250 | | | | 7000 |
| 260 | | | | 15000 |
| 270 | | | | Failed |

The advantages of this invention can be obtained with other dielectric structures including aluminum-film-paper-aluminum, aluminum-film-paper-film-aluminum, and aluminum-film-paper-film-paper including aluminum, etc., using alternating layers of narrower foil with or without folded or rounded edges.

EXAMPLE 3 — Blends

Several compositions of mono- and di-, and a small amount of tri-isopropyl biphenyl were blended from a 95% mono- and a 93.5% di- stocks, and their corresponding viscosities and pour points were determined. The following Table gives the results.

| Mono(%) | Di(%) | Tri(%) | Viscosity (cs) at 100° F | Pour Point (° C) |
| --- | --- | --- | --- | --- |
| 95 | 3 | — | 4.64 | −51 |
| 76 | 22.7 | 1.3 | 5.37 | −51 |
| 57 | 39 | 2.6 | 6.08 | −48 |
| 38 | 57.3 | 3.9 | 8.07 | −47 |

The above table shows that there is little variation in viscosity and pour point over the range of blends tested, especially from about 20% to lower concentrations of diisopropyl biphenyl.

We claim:

1. A capacitor comprising layers of metal foil alternating with a dielectric spacer impregnated with a dielectric fluid which comprises:
   a. about 80 to about 99% by weight of a compound having the general formula

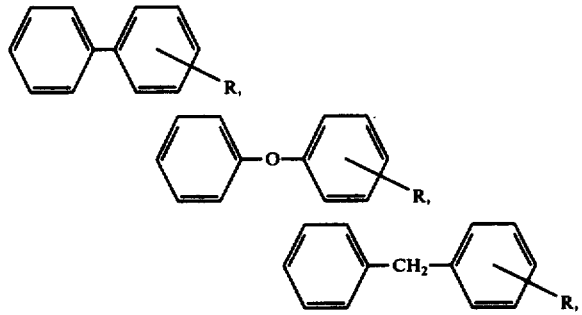

or mixtures thereof, where each R is independently selected from alkyl from $C_2$ to $C_4$; and
   b. about 1 to about 20% by weight of a compound having the general formula

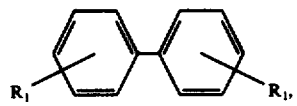

-continued

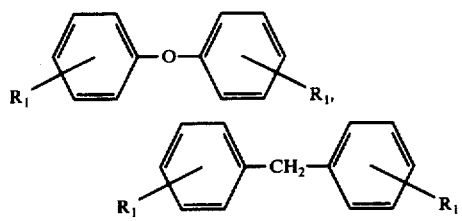

or mixtures thereof, where each $R_1$ is independently selected from alkyl from $C_2$ to $C_4$.

2. A capacitor according to claim 1 wherein all R and $R_1$ groups are the same.

3. A capacitor according to claim 2 wherein R and $R_1$ are isopropyl.

4. A capacitor according to claim 2 wherein R and $R_1$ are normal propyl.

5. A capacitor according to claim 1 wherein said dielectric fluid contains less than 0.5% biphenyl.

6. A capacitor according to claim 1 wherein said dielectric fluid contains up to about 1% by weight of an anti-oxidant and up to about 1% by weight of a hydrogen acceptor compound.

7. A capacitor according to claim 1 wherein said dielectric fluid contains about 0.01 to about 0.5% by weight of an anti-oxidant selected from the group consisting of di-t-butyl paracresol, di-t-butyl phenol, and mixtures thereof.

8. A capacitor according to claim 1 which contains up to 2% of a hydrogen acceptor compound.

9. A capacitor according to claim 8 wherein said dielectric fluid contains about 0.1 to about 0.5% by weight of an anthraquinone compound.

10. A capacitor according to claim 9 wherein said anthraquinone compound is β-methylanthraquinone.

11. A capacitor according to claim 1 wherein said dielectric fluid includes about 0.05 to about 1% of an epoxy.

12. A capacitor according to claim 1 wherein said dielectric spacer consists of paper, paper and film, or 100% film.

13. A capacitor according to claim 1 wherein every other layer of said metal foil is narrower.

14. A capacitor according to claim 13 wherein each layer of metal foil which is narrower has rounded edges.

15. A capacitor according to claim 1 wherein said compounds in parts (a) and (b) have the general formulae

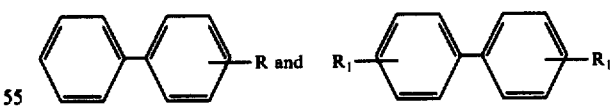

respectively.